(12) United States Patent
Yim et al.

(10) Patent No.: US 11,975,855 B2
(45) Date of Patent: May 7, 2024

(54) PROPULSION MODULE OF AIR MOBILITY VEHICLE

(71) Applicants: Hyundai Motor Company, Seoul (KR); Kia Corporation, Seoul (KR)

(72) Inventors: Chung Sik Yim, Anyang-Si (KR); Yong Hyun Nam, Anyang-Si (KR); Jae Young Choi, Seongnam-Si (KR); Sang Hyun Jung, Hwaseong-Si (KR); Dae Hee Lee, Incheon (KR); Jae Seung Lee, Hwaseong-Si (KR); Kyu Hoon Cho, Suwon-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 389 days.

(21) Appl. No.: 17/408,262

(22) Filed: Aug. 20, 2021

(65) Prior Publication Data
US 2022/0194611 A1     Jun. 23, 2022

(30) Foreign Application Priority Data
Dec. 21, 2020   (KR) ........................ 10-2020-0179654

(51) Int. Cl.
*B64D 27/40*    (2024.01)
*B64C 27/50*    (2006.01)

(52) U.S. Cl.
CPC .............. *B64D 27/40* (2024.01); *B64C 27/50* (2013.01); *B64C 2211/00* (2013.01); *B64D 27/402* (2024.01); *B64D 27/404* (2024.01)

(58) Field of Classification Search
CPC . B64C 29/0033; B64C 27/50; B64C 2211/00; B64D 27/14; B64D 27/24; B64D 2027/026; B64D 27/26
See application file for complete search history.

(56) References Cited

U.S. PATENT DOCUMENTS

| | | | | |
|---|---|---|---|---|
| 3,149,800 A | * | 9/1964 | Sintes | B64C 3/42 244/102 R |
| 3,612,444 A | * | 10/1971 | Girard | B64C 27/30 244/49 |
| 10,894,599 B1 | * | 1/2021 | Popiks | B64U 10/25 |
| 10,946,705 B1 | * | 3/2021 | Neuman | B64C 27/12 |
| 11,124,306 B2 | * | 9/2021 | Murrow | B64D 31/06 |
| 2020/0031478 A1 | * | 1/2020 | Clark | B64C 1/16 |
| 2021/0039783 A1 | * | 2/2021 | Weekes | B64U 30/20 |

FOREIGN PATENT DOCUMENTS

KR         10-2122990         6/2020

* cited by examiner

*Primary Examiner* — Christopher D Hutchens
*Assistant Examiner* — Steven J Shur
(74) *Attorney, Agent, or Firm* — MORGAN, LEWIS & BOCKIUS LLP

(57) ABSTRACT

A propulsion module of an air mobility vehicle may include a door provided in the housing and opening or closing the opening portion of the housing by a sliding motion of the door; a propeller for providing propulsion to the air mobility vehicle; a link assembly having a first end portion connected to the housing and a second end portion connected to the propeller to pull the propeller into the internal space of the housing through the opening portion or pull the propeller outside the internal space through the opening portion; and a door opening and closing portion coupled to the door and configured for providing an opening and closing force to the door according to an inward-pulling motion or an outward-pulling motion of the propeller.

12 Claims, 5 Drawing Sheets

PROPULSION MODULE OF AIR MOBILITY VEHICLE

CROSS REFERENCE TO RELATED APPLICATION

The present application claims priority to Korean Patent Application No. 10-2020-0179654, filed Dec. 21, 2020, the entire contents of which is incorporated herein for all purposes by this reference.

BACKGROUND OF THE INVENTION

Field of the Invention

The present invention is related to a propulsion module of an air mobility vehicle which may use a single actuator to raise and lower a propeller while opening and closing a door at the same time, use the propeller when lifting the air mobility vehicle, and accommodate the propeller inside the propulsion module during cruising, reducing drag, and improving aerodynamics by closing the door.

Description of Related Art

A propeller of an air mobility vehicle is composed of a lifting propeller and a cruising propeller. Among these propellers, since the lifting propeller used for lifting and descending the air mobility vehicle acts as air resistance during cruising, the propeller should be folded and accommodated inside a boom of the air mobility vehicle, to increase a cruising distance of the air mobility vehicle.

However, when raising or lowering a propeller assembly, and when opening or closing a boom door separately, additional actuators must be connected thereto respectively, and in the present case, the increase of weight and cost inevitably occurs.

Accordingly, there is a demand for a technology capable of synchronizing the raising and lowering of the propeller and the opening and closing of the door by using a single actuator.

The information disclosed in this Background of the Invention section is only for enhancement of understanding of the background of the invention and may not be taken as an acknowledgement or any form of suggestion that this information forms the prior art already known to a person skilled in the art.

BRIEF SUMMARY

Various aspects of the present invention are directed to providing a propulsion module of an air mobility vehicle which may use a single actuator to raise and lower a propeller while opening and closing a door at the same time, use the propeller when lifting the air mobility vehicle, and accommodate the propeller inside the propulsion module during cruising, reducing drag, and improving aerodynamics by closing the door.

According to various exemplary embodiments of the present invention for achieving the above objective, a propulsion module of an air mobility vehicle includes: a housing having an internal space in the housing and having one side of the housing provided with an opening portion; a door provided in the housing and opening or closing the opening portion of the housing by a sliding motion of the door; a propeller mounted in the internal space of the housing and providing propulsion to the air mobility vehicle; a link assembly having a first end portion connected to the housing and a second end portion connected to the propeller to pull the propeller into the internal space of the housing through the opening portion or pull the propeller outside the internal space through the opening portion; and a door opening and closing portion coupled to the door and configured for providing an opening and closing force to the door according to an inward-pulling motion or an outward-pulling motion of the propeller.

The housing may be a boom or a wing of the air mobility vehicle.

The opening portion may be provided at an upper end portion of the housing, and the propeller may be pulled outside of the housing through the opening portion when raised, and may be pulled inside the housing through the opening portion when the propeller is lowered.

The propeller may be raised and lowered from the housing and is a lifting propeller that provides vertical propulsion to the air mobility vehicle.

The link assembly may include: a link having a first end portion pivotally connected to the housing and a second end portion pivotally connected to the propeller; and an actuator coupled to the link and configured for providing a rotational force to the link.

When extending, the actuator having a first end portion connected to the housing and a second end portion coupled to a portion of the link may rotate the link in an outward-pulling direction of the propeller.

The door may be a two-door type door that opens and closes the opening portion of the housing from opposite sides thereof.

A gas lifter may be provided between the door and the housing, so that the door constantly receives force in a closing direction thereof.

The propeller and the door may be connected to each other with a wire so that when the propeller is pulled outward of the housing, the wire may pull the door to open the door, and when the propeller is pulled inward of the housing, the wire may be released to close the door.

While the wire is engaged on a pulley provided in the housing, one end portion of the wire may extend to one side thereof to be connected to the propeller, and the other end portion of the wire may extend in the same direction as that of the one end portion thereof, to be connected to the door.

According to the propulsion module of the air mobility vehicle of the present invention, there is an effect in that the propulsion module may use the single actuator to raise and lower the propeller while opening and closing the door at the same time, use the propeller when lifting the air mobility vehicle, and accommodate the propeller inside the propulsion module during cruising, reducing drag, and improving aerodynamics by closing the door.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
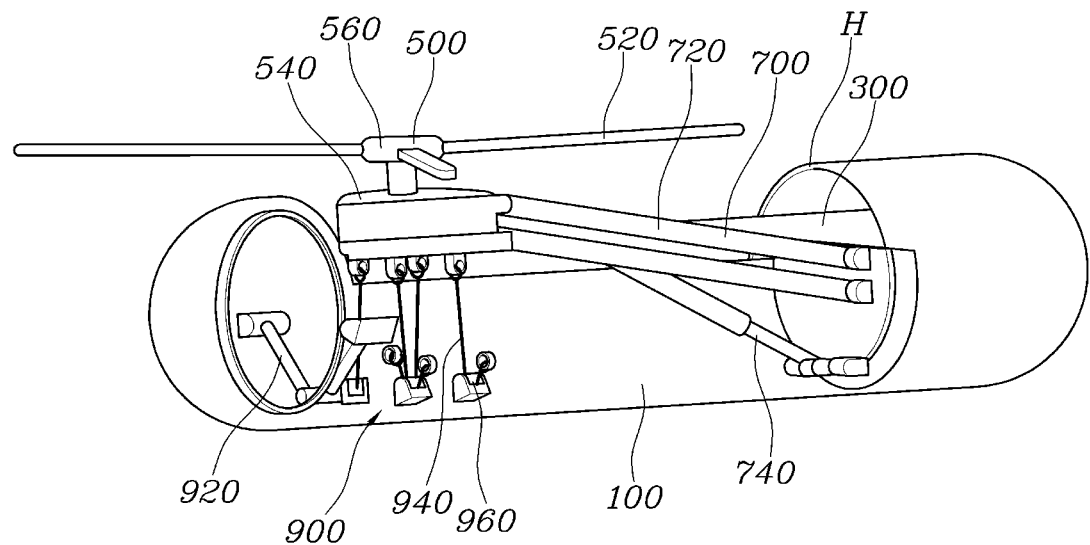
FIG. 1 is a perspective view of a propulsion module of an air mobility vehicle according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Figure 2:
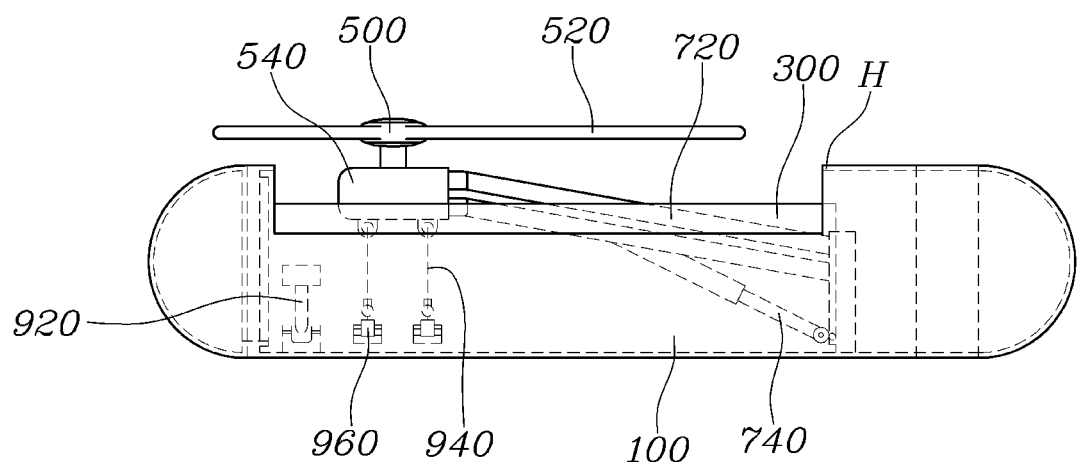
FIG. 2, FIG. 3 and FIG. 4 are views showing an opened state of the propulsion module of the air mobility vehicle according to the exemplary embodiment of the present invention.
Figure 3:
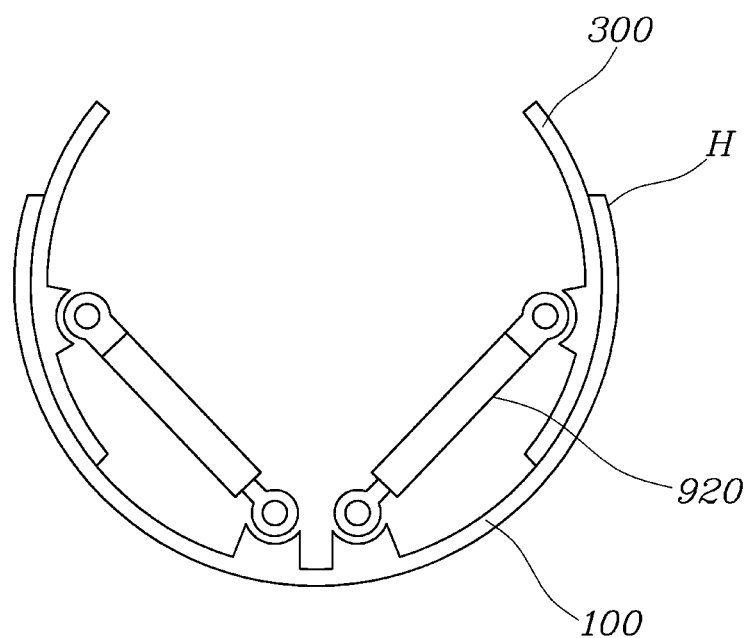
Figure 4:
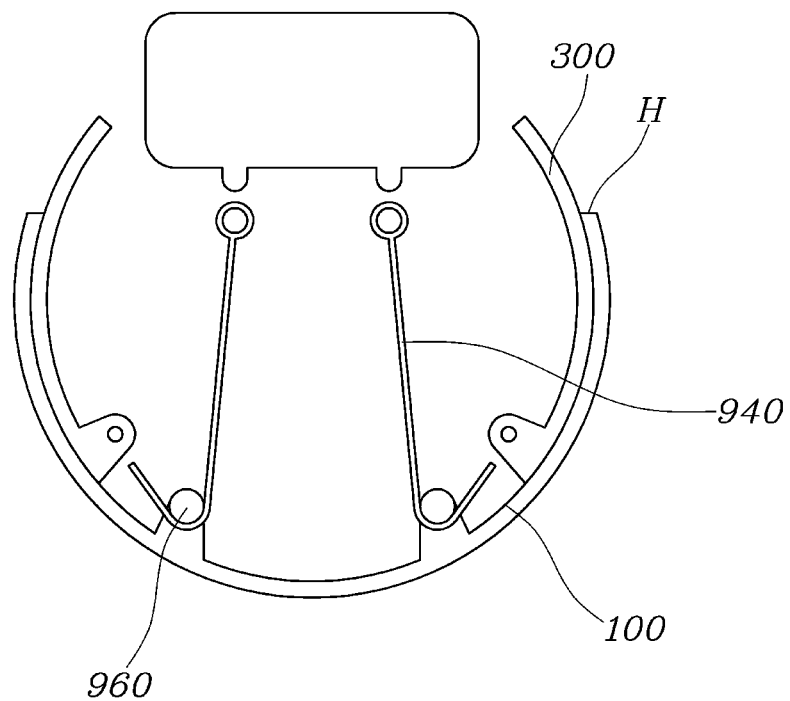
Figure 5:
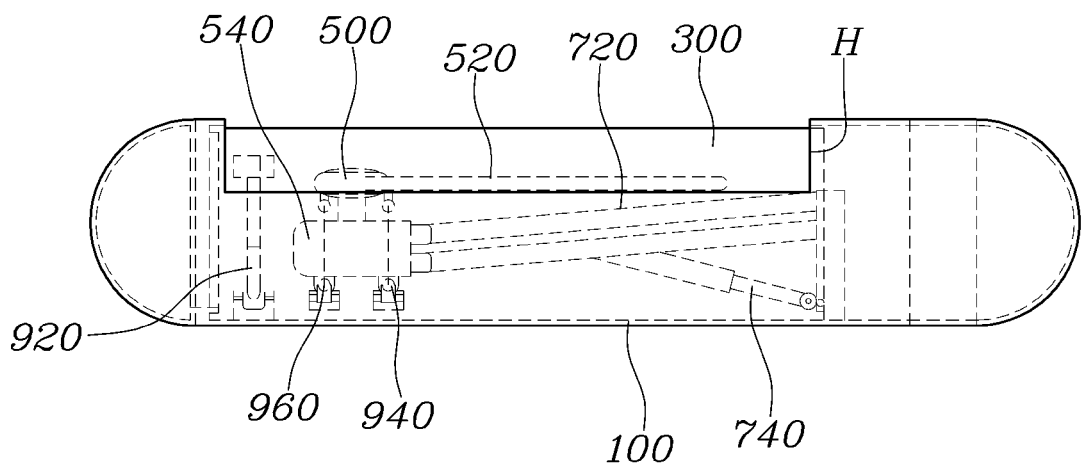
FIG. 5, FIG. 6 and FIG. 7 are views showing a closed state of the propulsion module of the air mobility vehicle according to the exemplary embodiment of the present invention.
Figure 6:
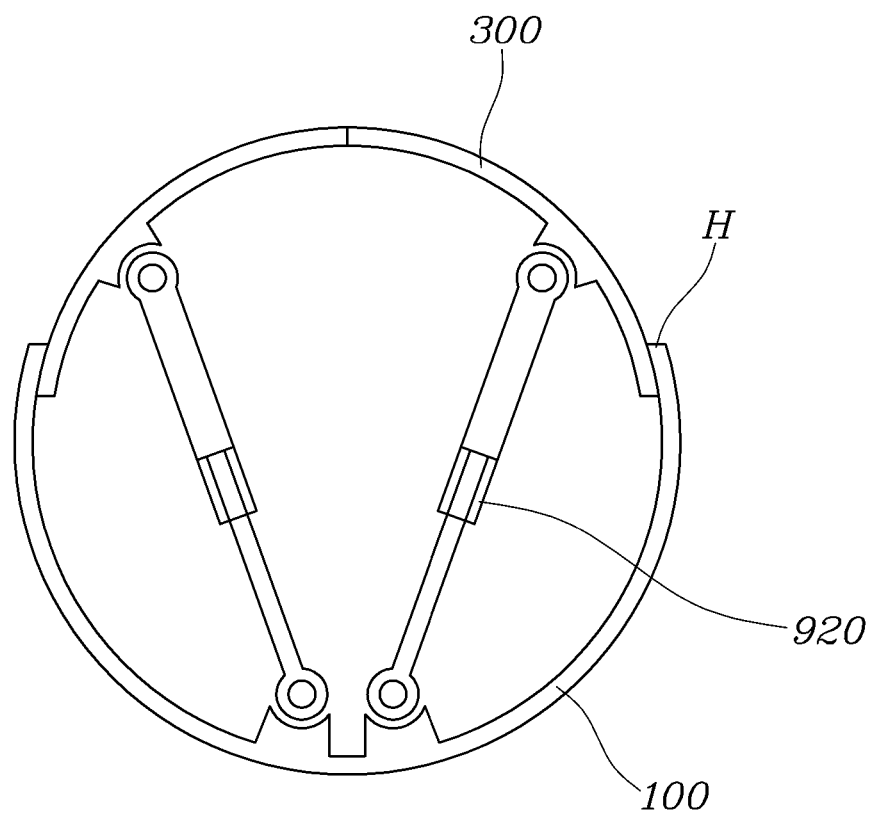
Figure 7:
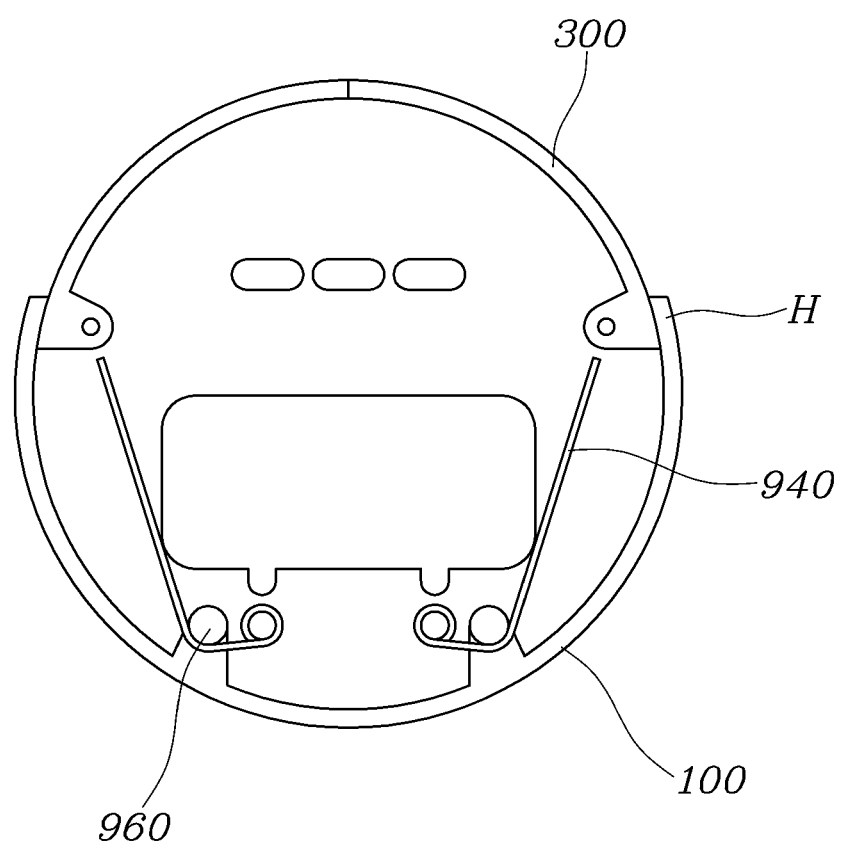
Figure 8:
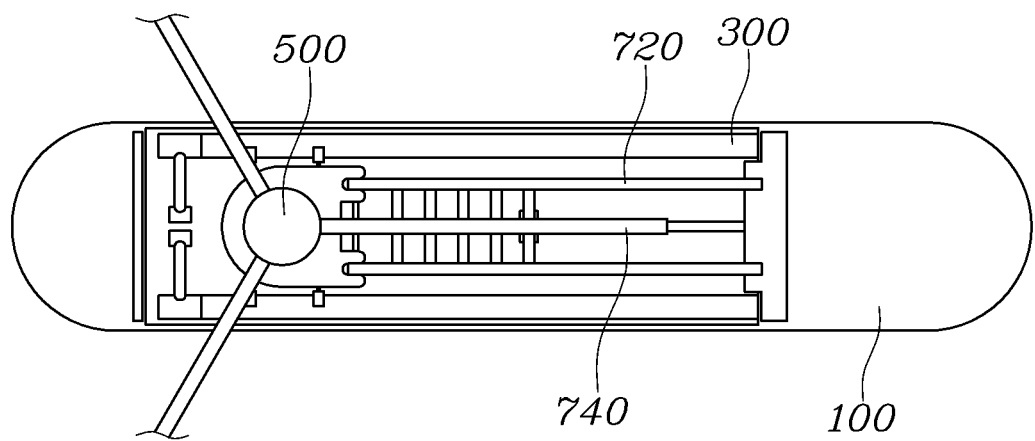
FIG. 8 and FIG. 9 are views showing an operation of the propulsion module of the air mobility vehicle according to the exemplary embodiment of the present invention.
Figure 9:
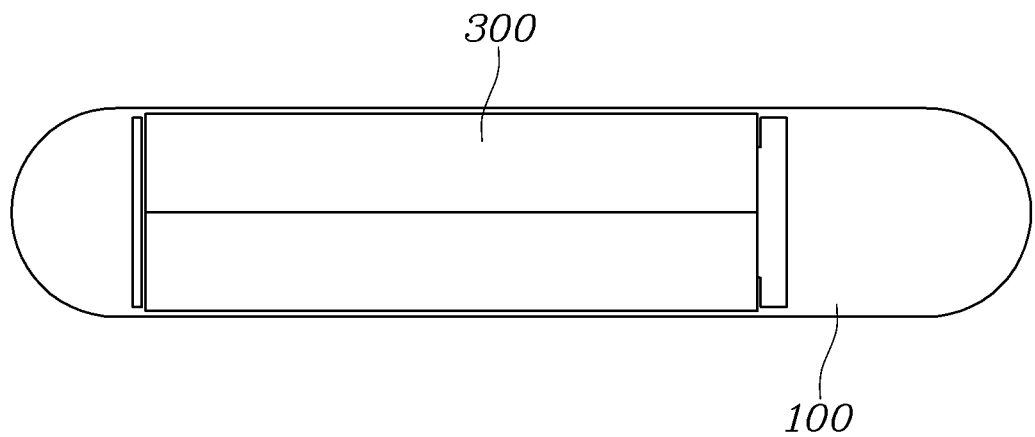

FIG. 1 is a perspective view of a propulsion module of an air mobility vehicle according to various exemplary embodiments of the present invention, FIG. 2, FIG. 3 and FIG. 4 are views showing an opened state of the propulsion module of the air mobility vehicle according to the exemplary embodiment of the present invention, FIG. 5, FIG. 6 and FIG. 7 are views showing a closed state of the propulsion module of the air mobility vehicle according to the exemplary embodiment of the present invention, and FIG. 8 and FIG. 9 are views showing an operation of the propulsion module of the air mobility vehicle according to the exemplary embodiment of the present invention.

FIG. 1 is the perspective view of the propulsion module of the air mobility vehicle according to the exemplary embodiment of the present invention, and the propulsion module of the air mobility vehicle according to various exemplary embodiments of the present invention may include a housing 100 having an internal space formed therein and having one side thereof provided with an opening portion H; a door 300 provided in the housing 100, and opening and closing the opening portion H by a sliding motion of the door; a propeller 500 disposed in the internal space of the housing 100 and providing propulsion to the air mobility vehicle; a link assembly 700 having one end portion thereof connected to the housing 100 and having the other end portion thereof connected to the propeller 500 to pull the propeller 500 inward to the internal space of the housing 100 or pull the propeller 500 outward to an external space of the housing 100 through the opening portion H; and a door opening and closing portion 900 for providing an opening and closing force to the door 300 in conjunction with the inward-pulling or outward-pulling motion of the propeller 500.

The air mobility vehicle of the present invention may be applied to a system for distributed propulsion through a plurality of propellers. Regarding the propeller, the present invention is suitable for a lifting propeller in which it is required not only to be unfolded and deployed for propulsion when lifting and descending the air mobility vehicle, but also to be folded and accommodated inside the air mobility vehicle for reducing the air resistance during cruising.

A lifting propeller is provided in a boom of an air mobility vehicle. In the present respect, the housing of the present invention may be the boom or wing of the air mobility vehicle.

The housing 100 has an internal space formed therein, and has one side thereof provided with an opening portion H. The propeller 500 is provided in the internal space of the housing 100. Through the opening portion H, the propeller 500 is pulled outward to the outside of the housing 100 or pulled inward to the inside of the housing 100. The propeller 500 provides propulsion for lifting when pulled outward, and reduces the air resistance during cruising by being accommodated in the inside of the air mobility vehicle when pulled inwardly.

Furthermore, the door 300 is provided in the opening portion H of the housing 100 to open or close the opening portion by a sliding motion. When the propeller 500 is pulled outward, the door 300 is opened to allow the propeller 500 to be pulled outward to the outside, and when the propeller 500 is pulled inwardly, the, the door 300 is closed to form the external surface of the housing 100, improving aerodynamics of the housing 100 during cruising.

The propeller 500 is disposed in the internal space of the housing 100, and provides propulsion for lifting to the air mobility vehicle when pulled outward to the outside.

Furthermore, the link assembly 700 has one end portion thereof connected to the housing 100 and has the other end portion thereof connected to the propeller 500, so as perform an operation to allow the propeller 500 to be pulled inward to the internal space of the housing 100 or to be pulled outward to the external space of the housing 100 through the opening portion H.

Furthermore, the door opening and closing portion 900 provides an opening and closing force to the door 300 in conjunction with the inward-pulling or outward-pulling motion of the propeller 500.

In various exemplary embodiments of the present invention, an actuator 740 is provided in the link assembly 700, so that the inward-pulling or outward-pulling motion of the propeller 500 is controlled through the link assembly 700. Furthermore, the door opening and closing portion 900 connected to the link assembly 700 or the propeller 500 is provided to open or close the door 300 by receiving the motion of the link assembly 700 or the propeller 500 and interlocking with the door 300. Accordingly, both the inward-pulling and outward-pulling motion of the propeller 500 and the opening and closing of the door 300 are controlled through a single actuator 740.

The reason is that since the opening portion H needs to be opened when the propeller 500 is required to be pulled outward, and since the door 300 also needs to be closed when the propeller 500 is required to be pulled inwardly, it is possible that the two motions are combined through a single actuator 740.

Furthermore, the opening portion H may be formed on the upper end portion of the housing 100, and the propeller 500 may be pulled outward to the outside of the housing 100 through the opening portion H when raised and be pulled inward to the inside of the housing 100 when the propeller is lowered. Furthermore, the propeller 500 may be a lifting propeller which is raised and lowered from the housing 100 and provides vertical propulsion to the air mobility vehicle. The propeller 500 includes a blade 520 and a motor 540, and through a separate operation mechanism 560, it is possible for the blades 520 to be folded gathering together, or to be unfolded together. In various exemplary embodiments of the present invention, when the propeller 500 is pulled inwardly, the, the blades 520 are controlled to be folded gathering together.

FIG. 2, FIG. 3 and FIG. 4 are views showing an opened state of the propulsion module of the air mobility vehicle according to the exemplary embodiment of the present invention, and FIG. 5, FIG. 6 and FIG. 7 are views showing a closed state of the propulsion module of the air mobility vehicle according to the exemplary embodiment of the present invention.

The link assembly 700 may be include: a link 720 having one end portion thereof connected to the housing 100 and having the other end portion thereof connected to the propeller 500; and an actuator 740 providing a rotational force to the link 720. As shown, the actuator 740 has a shape of a cylinder that may be extended or contracted, which may be configured in an electric or hydraulic type.

In an exemplary embodiment of the present invention, the link 720 may be in plural and the one end portions thereof are pivotally connected to the housing 100 and the other end portions thereof are pivotally connected to the propeller 500.

FIG. 2 shows a state where the propeller 500 is deployed to the outside, FIG. 3 is a cross-sectional view showing a side of a gas lifter 920 of FIG. 2, and FIG. 4 is a cross-sectional view showing a side of a wire 940 of FIG. 2.

The actuator 740 has one end portion thereof connected to the housing 100 and having the other end portion thereof connected to the link 720, so that the link 720 may be rotated in the outward-pulling direction of the propeller 500 when extending. That is, when it is necessary to pull the propeller 500 outward, the actuator 740 is extended as shown in FIG. 2, FIG. 3 and FIG. 4, and as a result, the link 720 is lifted and the propeller 500 is lifted upward as a whole.

Furthermore, the door 300 may be a two-door type door that opens and closes the opening portion H of the housing 100 from opposite sides thereof. Furthermore, the gas lifter 920 is provided between the door 300 and the housing 100, so that the door may constantly receive a force in the closing direction thereof. In a normal situation, the gas lifter 920 constantly pushes the door 300 and applies an elastic force to allow the door 300 to be in a closed state.

In the present state, the propeller 500 and the door 300 are connected to each other with the wire 940, so that when the propeller 500 is pulled outward, the wire 940 may be pulled to open the door and when the propeller 500 is pulled inwardly, the, the wire 940 may be released to close the door 300. Furthermore, while the wire 940 is hung on a pulley 960 provided in the housing 100, one end portion of the wire 940 may extend to one side thereof to be connected to the propeller 500, and the other end portion of the wire 940 may extend in the same direction as that of the one end portion of the wire 940, to be connected to the door 300.

That is, as shown in FIG. 2, FIG. 3 and FIG. 4, when the actuator 740 is extended for the outward-pulling of the propeller 500, the propeller 500 is raised. At the instant time, as shown in FIG. 4, the propeller 500 pulls the wire 940 due to the rise of the propeller 500, and since the wire 940 is connected to the door 300 through the pulley 960, the door 300 is pulled, opening the opening portion. Accordingly, the rise of the propeller 500 and the opening of the door 300 are linked together.

In the present state, since the gas lifter 920 constantly applies force to close the door 300, when the extended position of the actuator 740 is fixed, the door 300 stably maintains its opened position without shaking.

Meanwhile, FIG. 5, FIG. 6 and FIG. 7 are views showing a closed state of the propulsion module of the air mobility vehicle according to the exemplary embodiment of the present invention. In the instant case, reversely, the actuator 740 is contracted and the link 720 is pulled. Accordingly, the propeller 500 is lowered into the interior of the housing 100. Furthermore, the wire 940 starts to be released as the propeller 500 is lowered, and accordingly, the door 300 is raised to become a closed state by the force of the gas lifter 920. Accordingly, even in the instant case, the inward-pulling of the propeller 500 and the closing of the door 300 are controlled together through a single actuator 740.

According to the propulsion module of the air mobility vehicle of the present invention, there is an effect in that the propulsion module may use a single actuator to raise and lower a propeller while opening and closing a door at the same time, use the propeller when lifting the air mobility vehicle, and accommodate the propeller inside the module when cruising, reducing drag, and improving aerodynamics by closing the door.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A propulsion module of an air mobility vehicle, the propulsion module comprising:
   a housing having an internal space in the housing and having one side of the housing provided with an opening portion;
   a door provided in the housing and opening or closing the opening portion of the housing by a sliding motion of the door;
   a propeller mounted in the internal space of the housing and providing propulsion to the air mobility vehicle;
   a link assembly having a first end portion connected to the housing and a second end portion connected to the propeller, to pull the propeller into the internal space of the housing through the opening portion or pull the propeller outside the internal space through the opening portion; and a door opening and closing portion coupled to the door and configured for providing an opening and closing force to the door according to an inward-pulling motion or an outward-pulling motion of the propeller, wherein the propeller and the door are connected to each other with a wire so that when the propeller is pulled outward of the housing, the wire pulls the door to open the door, and when the propeller is pulled inward of the housing, the wire is released to close the door.

2. The propulsion module of claim 1, wherein the housing is a boom or a wing of the air mobility vehicle.

3. The propulsion module of claim 1,
wherein the opening portion is provided at an upper end portion of the housing, and
wherein the propeller is pulled outside of the housing through the opening portion when the propeller is raised, and is pulled inside the housing through the opening portion when the propeller is lowered.

4. The propulsion module of claim 1, wherein the propeller is raised or lowered from the housing and is a lifting propeller that provides vertical propulsion to the air mobility vehicle.

5. The propulsion module of claim 1, wherein the link assembly includes:
a link having a first end portion pivotally connected to the housing and a second end portion pivotally connected to the propeller; and
an actuator coupled to the link and configured for providing a rotational force to the link.

6. The propulsion module of claim 5, wherein, the actuator includes a first end portion pivotally coupled to the housing and a second end portion pivotally coupled to a portion of the link.

7. The propulsion module of claim 5, wherein, the actuator rotates the link in an outward-pulling direction of the propeller, when the actuator extends.

8. The propulsion module of claim 5, wherein, the actuator rotates the link in an inward-pulling direction of the propeller, when the actuator retracts.

9. The propulsion module of claim 1, wherein the door includes a first door member and a second door member that open or close the opening portion of the housing from opposite sides thereof with respect to the propeller, respectively.

10. The propulsion module of claim 1, wherein a gas lifter is provided between and coupled to the door and the housing, so that the door constantly receives force in a closing direction of the door by the gas lifter.

11. The propulsion module of claim 1,
wherein the wire is engaged on a pulley provided in the housing, and a first end portion of the wire extends to one side thereof to be connected to the propeller, and
wherein a second end portion of the wire extends from the pulley in a direction to be connected to the door.

12. The propulsion module of claim 11, wherein a gas lifter is provided between and coupled to the door and the housing, so that the door constantly receives force in a closing direction of the door by the gas lifter.

* * * * *